(12) United States Patent
Pagliacci

(10) Patent No.: US 10,155,326 B2
(45) Date of Patent: Dec. 18, 2018

(54) PREFORM OF PLASTIC MATERIAL WITH LIGHTENED CLOSED END

(71) Applicant: Concordia Development S.r.l., Milan (IT)

(72) Inventor: Gianfilippo Pagliacci, Milan (IT)

(73) Assignee: CONCORDIA DEVELOPMENT S.R.L., Milan (IT)

( * ) Notice: Subject to any disclaimer, the term of this patent is extended or adjusted under 35 U.S.C. 154(b) by 320 days.

(21) Appl. No.: 14/763,541

(22) PCT Filed: Jan. 21, 2014

(86) PCT No.: PCT/IB2014/058427
§ 371 (c)(1),
(2) Date: Jul. 27, 2015

(87) PCT Pub. No.: WO2014/115074
PCT Pub. Date: Jul. 31, 2014

(65) Prior Publication Data
US 2015/0352746 A1    Dec. 10, 2015

(30) Foreign Application Priority Data

Jan. 25, 2013 (IT) .............................. MI2013A0115
Jun. 28, 2013 (IT) .............................. MI2013A1084

(51) Int. Cl.
*B29B 11/14* (2006.01)

(52) U.S. Cl.
CPC ..... *B29B 11/14* (2013.01); *B29B 2911/14013* (2013.01); *B29B 2911/1464* (2013.01); *B29B 2911/14486* (2013.01); *B29B 2911/14493* (2013.01); *Y10T 428/1397* (2015.01)

(58) Field of Classification Search
CPC ........... B29B 11/14; B29B 2911/14013; B29B 2911/14486; B29B 2911/14493; B29B 2911/1464; Y10T 428/1397
See application file for complete search history.

(56) References Cited

U.S. PATENT DOCUMENTS

| 5,888,598 | A | 3/1999 | Brewster |
| 2009/0223920 | A1 | 9/2009 | Patel |
| 2010/0055369 | A1 | 3/2010 | Kelley |

FOREIGN PATENT DOCUMENTS

| GB | 2 048 757 | 12/1980 |
| WO | 2007 060529 | 5/2007 |

*Primary Examiner* — David Sample
*Assistant Examiner* — Elizabeth Collister
(74) *Attorney, Agent, or Firm* — Bay State IP, LLC

(57) ABSTRACT

Preform, made of plastic material for the manufacturing of hollow bodies through a blow-molding process, in which said preform comprises a substantially cylindrical body (1) having an open end (2) and a closed end {4}, in which said closed end (4) has an outer surface with a varying curvature which is entirely enveloped within a hemispherical surface having a radius equal to the outer radius (R) of the cylindrical body (1) of the preform, said outer surface with varying curvature being tangent to the hemispherical surface in which it is enveloped in correspondence of the circular crown C and of the preform vertex.

10 Claims, 1 Drawing Sheet

PREFORM OF PLASTIC MATERIAL WITH LIGHTENED CLOSED END

CROSS REFERENCE TO RELATED APPLICATION

This application is for entry into the U.S. National Phase under § 371 for International Application No. PCT/IB2014/058427 having an international filing date of Jan. 21, 2014, and from which priority is claimed under all applicable sections of Title of the United States Code including, but not limited to, Sections 120, 363, and 365(c), and which in turn claims priority under 35 USC 119 to Italian Patent Application No. MI2013A000115 filed on Jan. 25, 2013 and to Italian Patent Application No. MI2013A001084 filed on Jun. 28, 2013.

FIELD OF THE INVENTION

The present invention refers to an improved preform for the production of hollow bodies and, in particular, of bottles of any kind and size, through a blow-moulding process.

STATE OF THE PRIOR ART

As it is well-known to experts in the field, the production of bottles or jugs made of plastic material is, up until today, almost exclusively carried out through a 2-step process which implies the production and use of hollow semi-processed products having a substantially cylindrical shape, known precisely as preforms or paraisons. In the first step of such process the production of hollow preforms having a large thickness is hence carried out—in a strongly centralised way, that is, by few specialised manufacturers—with longitudinal and transversal dimensions in a ratio of about 1:2 to 1:4 with respect to those of the finished bottle. Said preforms are preferably manufactured through an injection-moulding process of plastic material or, even though much less frequently, through a hot plastic deformation process under pressure of pipe sections.

In the second step of the process—which is instead normally carried out at the same plant where the bottling of the liquid to be packaged takes place—the hollow preforms are inserted into a mould and moulded according to the well-known blow-moulding process. Such process provides to heat the preforms up to a temperature sufficient for obtaining the necessary softening thereof, longitudinally stretch them as far as the final length of the bottle is obtained, through movement of a stretching rod which is inserted in the preform, and hence introduce in the thus heated and stretched preform one or more flows or com-pressed air suitably controlled in order to bring the material of the preform to adhere to the mould walls.

This manufacturing system allows noticeable and various advantages in the entire production chain, well-known to the experts in the field and which here it is hence not necessary to recall, which advantages have determined—as stated earlier—the almost general adoption, at world level, of this production system to obtain hollow bodies and in particular bottles of any kind, shape and size.

In particular, the above-described process has found a particularly suited application with the use of crystal plastic materials, such as for example PET (polyethylenteraphta-late). These materials, during the blow-moulding process, as a matter of fact undergo a biaxial orientation of the crystal-line structure, due to the longitudinal and transversal stretch-ing action which is determined during the blowing of the preform, such as to impart to the bottle particularly satis-factory mechanical features, notwithstanding an extremely low final thicknesses of the material. Precisely in connection with this last type of bottles a constant search has hence developed to optimise the production process in order to reduce—the volume of the final bottle being the same—the amount of plastic material used and hence the final cost of the bottle, despite maintaining unchanged the properties of mechanical resistance thereof. Among these, particularly important features of pressure resistance, cracking resistance and overturning resistance (verified by the so-called largely known "burst test", "stress cracking test" and "roll-out test") are displayed, which today, as a matter of fact, are univer-sally adopted to assess the mechanical features of a bottle obtained with the above-described manufacturing process.

Such research has initially addressed modifications in the shape of the finished bottle (for the purpose of identifying shapes having greater dimensional stability) and the fine-tuning of the different moulding parameters (stretching ratio of the preform, profile of the preform heating temperatures, pressure and flow rate or the blowing air, velocity of advancement of the stretching rod and the like).

In this first step of the research the traditional shape of the preform has hence remained substantially unmodified which consists, as already stated, of a hollow cylindrical body, with constant or varying thickness, provided with an open end which already has the final shape of the bottle neck area—and hence also comprises the threading necessary for the coupling of the screw cap—and with a closed end, meant to form the bottom of the bottle, of a hemispherical shape.

For the purpose of reducing the amount of plastic material which, in the finished bottle, remains in the central area of the bottom of the same and hence does not have direct usefulness for improving the mechanical resistance thereof, preforms with a non-hemispherical closed end and, in par-ticular, of an elliptical or parabolic shape (so called in the field, for simplicity's sake, even though more exactly they correspond to the shape of a rotational ellipsoid and parabo-loid, respectively) have then been suggested and partly used. However, while the preforms of this type have in fact allowed some advantage during preform moulding, allowing to obtain a modest reduction of the moulding times due to the greater linearity of the flow path of the molten plastic material which is injected in correspondence of the top of the closed end of the preform, with respect to that of the preforms having the traditional hemispherical shape of such end, they have not allowed instead appreciable results in terms of weight reduction of the preform, since the distri-bution of material in the finished bottle finally was not significantly different from that of the bottles obtained by preforms with a hemispherical closed end. Moreover, the adoption of such preforms necessarily requires a new adjust-ment of the blowing machines and in particular of the heating profiles of the closed end of the preform, which profiles must be conveniently adjusted on lower intensity levels, since the more elongated profile of the elliptical and parabolic shape determines a remarkable reduction of the resistance which the head itself opposes to the elongation imposed by the stretching rod, in the blow-moulding process of the bottle, with respect to the preforms with hemispherical closed end.

More recently, JP-200206712 has disclosed a preform in which the traditional hemispherical closed end has been modified by externally removing a bottom portion according to a plane perpendicular to the axis of the preform, that is removing material precisely in the area of the preform meant to form the central part of the bottom of the bottle. However, despite such a solution may apparently seem effective, the resulting strong thinning of the preform in correspondence of the vertex thereof determines various drawbacks. Firstly, the thickness of the preform wall cannot decrease, in general, below the limit of about 1-1.5 mm, in order to allow a regular flow without an early crystallisation of the plastic material during the moulding of the preform. This limit implies that in the smaller preforms (bottles from half a liter to 2 liters), which hence have a small wall thickness and a strong curvature of the hemispherical end, the weight reduction of the preform obtainable with this system is extremely reduced.

Moreover, the planar end of the preform requires the provision of a sufficiently wide outer feeding channel and, consequently, the residual sprue has a much greater height in respect of the preforms having an hemispherical closed end; such a type of sprue hence dramatically worsens the behaviour of the moulded bottle in the roll-out test. Finally, the small thickness of the preform wall in the vertex area makes extremely problematic, in the practical application, the stretching step during blow-moulding. As a matter of fact, the preform is strongly thinned out precisely in the area where the stretching rod performs its thrust, and it is hence extremely problematic to define heating temperatures of this preform which, on the one hand, are sufficiently high to allow a correct stretching of the preform and, in particular, of the bottom area thereof and, on the other hand, are not so high as to determine an excessive localised deformation or even the breaking of the preform bottom by the stretching rod.

A different modification of the closed end of the preform has been disclosed in EP-2077934. As a matter of fact, in the preform disclosed in this document both the overall height and the thicknesses of the wall of the preform which it is intended to modify are maintained unchanged, while the profile of the closed end of the preform is modified so as to comprise a central hollow appendix projecting outwards. Such profile thus takes on a more internal pattern with respect to that of the hemispherical closed end of a traditional preform of the same size and this implies a weight up to 2-3% of the overall weight of the preform—which reduction furthermore concentrates in the central area of the bottom of the bottle and hence does not diminishes in any way the mechanical performances of the bottle blown from such preform—without this implying change of the thicknesses of the preform wall. As a consequence all the above-highlighted problems for patent JP-200206712 are avoided and even better, the fundamental length and thickness parameters of the preform wall having been maintained unchanged, the blow-moulding parameters of this preform must in no way be changed with respect to those of a traditional hemispherical preform, hence remarkably facilitating the implementation of this preform as a replacement of the traditional ones in existing blow-moulding plants.

In the light of the positive features illustrated above, the preform disclosed in EP-2077934 has the disadvantage—when it is used in the reconversion of already existing plants—of requiring significant modifications of the preform injection moulds, since both the bottom of the cavities of the female mould, which determines the external shape of the closed end of the preform, and the mobile male of the mould, in order to modify also the inner shape of such closed end, must be modified. The costs of these modifications of the moulds, as well as those deriving from the missed production during the non-negligible idle times which such operation implies, hence make less appealing the application of the above-described preform in the reconversion of existing preform-moulding plants.

Problem and Solution

The object of the present invention is hence that of providing a new-concept, lighter preform which allows to achieve the desired weight reduction in the central area of the bottom of the bottle obtained therefrom and which may be used also in the reconversion of existing plants for the production of traditional hemispherical closed-end preforms with reduced costs for modifying the moulds of the moulding machines meant for the production thereof.

Such object is achieved, according to the present invention, by a preform having the features defined in the attached independent claim 1. Additional features of the preform of the invention are defined in the dependent claims.

BRIEF DESCRIPTION OF THE DRAWINGS

Further features and advantages of the invention will be in any case more evident from the following detailed description of a preferred embodiment thereof, given purely by way of a nonlimiting example and illustrated in the attached drawings, wherein.

DETAILED DESCRIPTION OF THE PREFERRED EMBODIMENT

Figure 3:
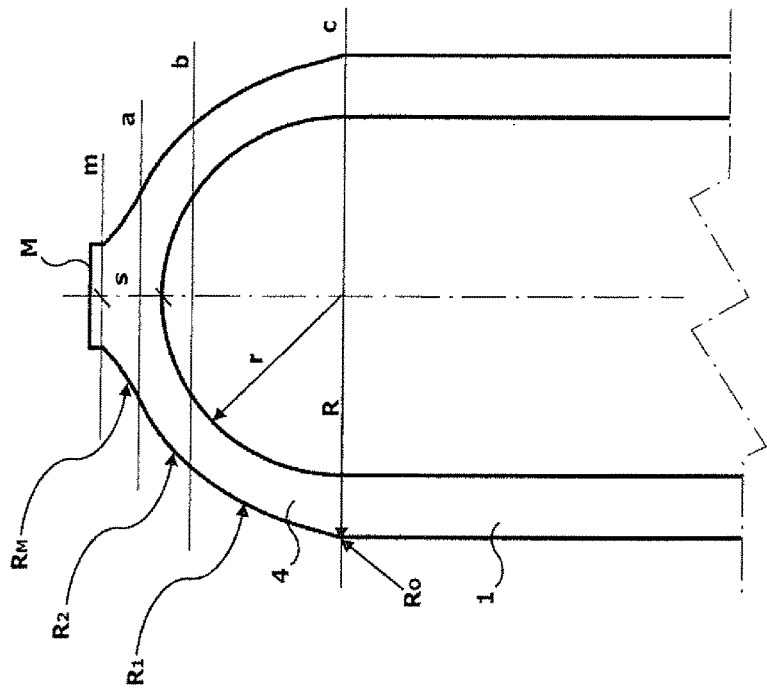
FIG. 3 is an enlarged-scale view of the closed end of the preform of FIG. 2, where the hatching of the sectioned parts has been omitted for greater clarity of representation.
Figure 2:
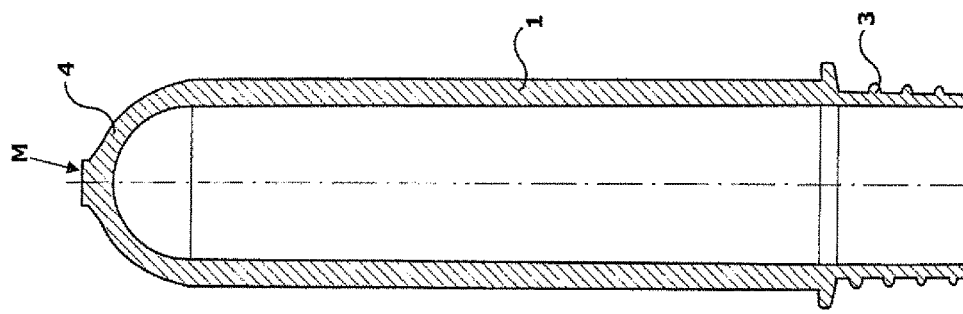
FIG. 2 is a schematic section view of the preform of FIG. 1.
Figure 1:
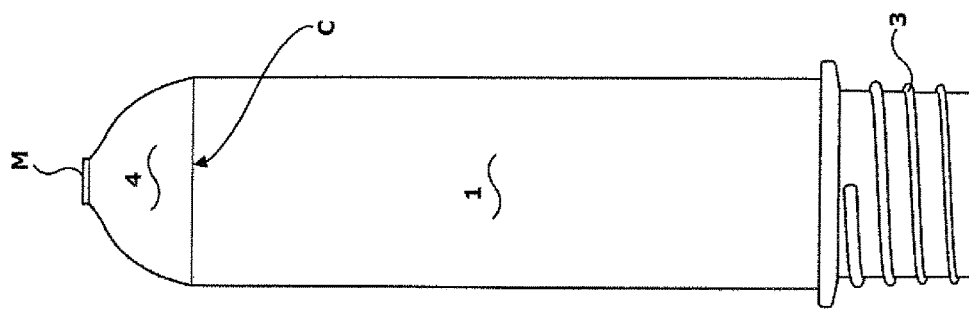
FIG. 1 is a front schematic view of a preform according to the present invention.

The preform of the present invention has a traditional general structure comprising a cylindrical body 1 provided with an open end 2, meant to form the bottle neck and carrying threading 3 for the engagement with a cap, and with a closed end 4, connected to cylindrical body 1 in correspondence of a circular crown C. Closed end 4 is the one from which entry of the molten plastic material occurs at the time of the filling of the relative mould and it hence has, in correspondence of the vertex thereof, where the injection point is located, a planar sprue M slightly in relief (for example by 0.5 mm) with respect to the remaining portion of said closed end.

According to the general solution concept of the present invention, the preform is characterised by an inner surface having mostly a hemispherical shape and by an outer surface with a varying curvature. Such outer surface having a varying curvature is furthermore entirely enveloped within a hemispherical surface corresponding to the one of the hemispherical closed end of a traditional preform, i.e. a surface having a radius equal to the outer radius R of cylindrical body 1; said outer surface having a varying curvature is furthermore tangent to the above said hemispherical surface in which it is enveloped, in correspondence of circular crown C and of the preform vertex.

In the area comprised between the two above-said tangency areas, the varying curvature outer surface of the preform of the invention can be freely designed according to any profile in order to determine both the desired weight reduction of the closed end of the preform and a preferred geometrical shape of the same and furthermore to maintain everywhere a minimum wall thickness of the preform sufficient not to hinder the flow of the plastic material molten during injection moulding of the preform.

Preferably, the zone showing a minimum wall thickness of the closed end of the preform is located within an angle between 45° and 85°, and even more preferably between 55° and 75°, as seen in an axial section of the preform, said angle having its vertex in the centre of circular crown C and one of the angles sides lying in the circular crown C plane (trace c in FIG. 3), the angle of 90° being the one having the other of its sides passing through the preform vertex.

Although the outer surface of the preform may be accomplished with any desired curvature, safe for the general parameters indicated, in order to make the building of the relative mould more rapid and inexpensive it is instead preferable that it consists of multiple spherical adjacent areas, each one characterised by a specific curvature radius, said areas being preferably mutually tangent and also tangent to the cylindrical body 1 of the preform, along the mutual contact circumferences.

In the case in which, due to requirements dictated by the desired shape of the outer surface having a varying curvature, it should be convenient to provide non mutually tangent adjacent spherical areas along the contact circumference, it is preferable that said areas be separated by spherical connection zones having a low height and a short radius so as to be tangent to the neighbouring portions of said non mutually tangent adjacent spherical areas. This situation occurs with special frequency in the case of the spherical area adjacent to circular crown C, where it is often preferable to adopt a spherical area non directly tangent to cylindrical body 1 of the preform in order to allow a more rapid moving away of the outer surface of the preform with respect to the hemispherical envelope surface of the same and hence a more pronounced weight reduction of the preform with respect to a conventional preform having a hemispherical closed end.

In the following description exclusive reference will be made, for simplicity's sake, to an exemplary preferred embodiwent in which the outer surface of the preform consists of multiple spherical areas each one having a different radius; however, such an embodiment must not be considered in any way as limiting the scope of the present invention.

As clearly illustrated in the drawings, and in particular in the section view of FIG. 3, the volume of closed end 4 of the preform of the present invention is defined by the two outer and inner surfaces of the same, which show, as stated above, a different profile one from the other, so that the wall thickness of closed end 4 is not constant. As a matter of fact, the inner surface of end 4 is normally hemispherical—as a direct consequence of the fact that the vast majority of preform moulding machines operating on the market have this shape, even though preforms having a non-hemispherical inner surface of the closed end are also comprised in the scope of the present invention—and hence it has a constant inner radius r, while the outer surface is a cup surface with varying radiuses, i.e. consisting of adjacent spherical areas having different radiuses and centre of curvature not necessarily coinciding with the centre of circular crown C.

In a preferred embodiment, the outer surface of the preform closed end of the present invention is formed so as to be, as seen from the outside of the preform, convex in a first peripheral portion thereof, starting from circular crown C, and then concave in a second central portion thereof, adjacent to sprue M. The convex portion of the above-said outer surface may have a greater or smaller extension towards sprue M, with a corresponding reduction of the concave portion of the same, provided that the zone with minimum wall thickness of the closed end of the preform meets the requirements of angular position already defined above. As a matter of fact, positioning such minimum thickness zone above the value of 85° or below the value of 45°, the lightening effect of the closed end 4 would be less significant, and furthermore the regularity of the flow lines of the molten plastic material for the injection moulding of the preform would be impaired.

Conversely, the concave portion of the above-said outer surface of the preform closed end may extend in the direction of circular crown C, with a corresponding reduction of the convex portion of the same, until reaching a maximum height—measured as the distance between the planes of trace m and a, where such planes are defined as the one which separates sprue M from the preform and as the one which separates the convex portion from the concave portion of said outer surface, respectively—equal to twice the preform wall thickness in the injection point, sprue M excluded. As a matter of fact, beyond such value, the minimum value of the wall thickness in an intermediate zone of closed end 4 is so low as to make the preform-filling flow during the moulding step difficult. In any case, the above parameters must be selected so that, at any point of closed end 4, the wall thickness is not below the value of 1 mm.

In the above-said convex peripheral portion, the varying radius of said outer surface is preferably smaller than the diameter 2R of the cylindrical body 1 of the preform. Depending on the preform dimensions, the convex peripheral portion of the closed end of the preform may comprise of course a greater or smaller number of spherical areas having different radius.

When in said convex peripheral portion of the closed end 4 of the preform more than one spherical area is present, the radius of said spherical areas may have both a decreasing trend starting from the spherical area adjacent to circular crown C and towards the preform vertex—of course not taking into consideration any spherical connection zones having low height and small radius—and instead an increasing trend. In the former preform type the closed end of the preform will have a more rounded shape, in the latter a more give shape; the former type of preform being currently preferred since it offers greater resistance to the action of the stretching rod and hence allows a more even elongation of the preform.

In the drawings a preferred embodiment of the former preform type described above is shown, wherein the convex part of the outer surface of closed end 4 is formed according to only two radiuses $R_1$ and $R_2$ having a decreasing value; radius $R_1$ which extends between the planes of trace c and b and radius $R_2$ which extends between the planes of trace b and a. The concave part of the outer surface of the preform closed end comprises instead a single radius $R_M$ and extends, as already stated above, between the plane of trace a and the plane of trace m. Preferably, it is furthermore useful to provide a low height connection zone having very small radius $R_0$ between the first convex portion of the outer surface and the cylindrical surface of body 1; as a matter of fact, such connection zone allows, as already illustrated above, to cause the outer surface to start with a certain inclination with respect to the tangent to the cylindrical surface of body 1, without determining the creation of edge zones.

This special arrangement of the closed end 4 of the preform allows to achieve the desired weight reduction of such closed end, precisely due to the presence of the different spherical areas having different radiuses of the convex portion. As a matter of fact, the outer profile of closed end 4 can thus be moved in the desired extent towards the axis of the preform, with respect to a preform having the same diameter as the cylindrical body and a hemispherical closed end, and hence the inventive preform shows a reduced volume and a consequently lower weight in respect to the above said traditional preform.

At the same time, and unlike what has been disclosed in the above-cited prior art JP-200206712, the thickness of the closed end is not substantially modified in the preform vertex area, that is in the area in which the stretching rod acts during the preform blowing and moulding step, so that no undesired slowing down of the flow of molten material occurs during injection moulding of the preform nor a weakening or deformation of the preform during the stretching step of a blow-moulding operation. As a matter of fact, the maximum wall thickness reduction arises in an intermediate zone of closed end 4, sufficiently far from the area in which the stretching rod imparts the maximum effort during the preform stretching step.

The thickness reduction in this intermediate zone of closed end 4 is also favourable with respect to the filling flow of the preform during the injection moulding step thereof, because in that zone the flow of molten polymer material has already undergone in the preform vertex area the most relevant and quick direction deviation by 90°, and moves according to a laminar motion without therefore causing any substantial drawback to the passage through the minimum-thickness section.

As already stated above, the profile of the inner surface of closed end 4 is hemispherical. In the case of conversion of existing plants it is hence possible to achieve a very remarkable simplification of the change operations of the existing moulding machines, since such operations concern exclusively the female mould of the machine, and in particular the sole bottom cavity of the same—normally consisting of a separate piece with respect to the one which forms the cylindrical portion of the preform—leaving fully unmodified the male thereof. As is well-known to experts in the field the change of the female mould is far simpler, more economic and fast than the change of the male one, so that the costs of the modification of the preform moulding machines—as well as the idle times for the installation of said modifications—are about one third, by adopting the preform according to the present invention, with respect to the ones necessary with the preform disclosed in the above-described prior art document EP-2077934.

It is useful to stress here that the same advantages described above in the case of reconversion of plants for the product of hemispherical-head preforms may be obtained also in plants for the production of preforms having a non-hemispherical inner shape of the closed end and hence a different shape of the male with respect to the hemispherical one described above. In this case, too, the shape of the male may remain unmodified and the outer surface of the preform closed end may be modulated by adopting, for the convex part thereof, the number, the extent and the radius of the spherical areas having different radiuses, suitable to obtain the desired weight reduction of the preform.

For the purpose of a greater simplification construction of the mould, it is finally possible to provide that one or more of the spherical areas with different radius making up the outer surface of the preform closed end 4 of the present invention, have infinite radius, i.e. that they consist of corresponding frusto-conical portions, mutually connected to the neighbouring portions through the above-said connection zones having low height and very small radius.

In the light of the above-described advantages, in the preform of the present invention there is of course the disadvantage of no longer having a constancy of thicknesses in the closed end 4 with respect to the conventional hemispherical-head preform which it is intended to replace, since the inner and outer profiles of the head of the preform have differing shapes as described above. In particular, there will be a thickness reduction in correspondence of an intermediate annular zone of the outer surface. Such thickness changes hence imply a necessary readjustment of the blowing conditions of the bottles with respect to the adjustment carried out with the traditional preforms and hence a relative cost which, however, is largely compensated by lower costs for the modifications of the moulds of the preform manufacturing plants.

Therefore, while with the preforms disclosed in EP-2077934 the costs of innovation were all to be borne at the beginning of the production chain, and hence by the preform manufacturers, with the preform of the present invention these costs are shared among said preform manufacturers and the users of the same which, unlike what happened with the known preform cited above, will now have to bear a partial innovation cost for the readjustment of the blowing machines. This more balanced sharing of costs, in the Applicant's opinion, might ease a more rapid and wide diffusion of the preforms of the present invention.

The present invention has been described with reference to a preferred embodiment of the same, but it is clear that there are a number of other embodiments different therefrom which can make use of the inventive principle of the invention. The invention is hence in no way limited by the features of the described embodiment, but only by the definitions of the invention provided in the attached claims.

The invention claimed is:

1. Preform made of plastic material for the manufacturing of hollow bodies through a blow-moulding process, wherein said preform comprises a substantially cylindrical body (1) having an open end (2) and a closed end (4) connected to said cylindrical body (1) in correspondence of a circular crown (C), wherein said closed end (4) has a varying-curvature outer surface entirely enveloped within a surface corresponding to a hemispherical closed end surface of a preform having a radius equal to the outer radius (R) of the cylindrical body (1) of the preform, said varying-curvature outer surface being tangent to said hemispherical closed end surface in which the varying-curvature outer surface is enveloped in correspondence of the circular crown (C) and of a preform vertex, wherein the inner surface of said closed end is a hemispherical surface and wherein said varying-curvature outer surface consists of multiple, adjacent, spherical areas, each one having a specific radius.

2. Preform as claimed in claim 1, wherein said spherical areas are mutually tangent and tangent to the cylindrical body (1) of the preform, along mutual contact circumferences.

3. Preform as claimed in claim 1, wherein the zone of the closed end (4) of the preform having a minimum wall thickness is found within an angle ranging between 45° and 85°, as seen in an axial section of the preform, said angle having its vertex in the centre of the circular crown (C) and one of the angle's sides lying in the circular crown (C) plane (c), the angle of 90° being the one having the other of its sides passing through the preform vertex.

4. Preform as claimed in claim 3 wherein said varying-curvature outer surface is convex in a first peripheral portion thereof, starting from the circular crown (C) connecting to said cylindrical body (1), and hence concave in a second central portion thereof adjacent to the moulding sprue (M) of the preform.

5. Preform as claimed in claim 4, wherein said concave second central portion of the varying-curvature outer surface extends, in the direction of the circular crown (C), up to a maximum height equal to twice the wall thickness of the preform at the injection point, excluding the sprue (M) thickness.

6. Preform as claimed in claim 1, wherein the wall thickness of said closed end is never below the value of 1 mm.

7. Preform as claimed in claim 4, wherein the different radiuses of the spherical areas of said first peripheral portion of the closed end (4) of the preform are smaller than the diameter (2R) of the cylindrical body (1).

8. Preform as claimed in claim 7, wherein said first peripheral portion of the varying-curvature outer surface of the closed end (4) of the preform comprises at least two spherical areas having a radius of different value.

9. Preform as claimed in claim 1, wherein a connection zone is furthermore provided between adjacent spherical areas having different inclination in correspondence of the respective contact circumferences with said connection zone.

10. Preform as claimed in claim 8, wherein a connection zone is furthermore provided between the spherical area of said first peripheral portion of the varying-curvature outer surface and the cylindrical surface of the preform body (1).

\* \* \* \* \*